US005803571A

United States Patent [19]

[11] Patent Number: 5,803,571
[45] Date of Patent: Sep. 8, 1998

McEntyre et al.

[54] I-SNOOT

[76] Inventors: Rick McEntyre, 109 Bradley Dr., Baldwin, Ga. 30511; Jerry R. London, 858 Gerrells Rd., Cleveland, Ga. 30528

[21] Appl. No.: 513,456

[22] Filed: Oct. 20, 1995

[51] Int. Cl.$^6$ .......... G01B 15/02

[52] U.S. Cl. .......... 362/18; 362/281; 362/321

[58] Field of Search .......... 362/18, 281, 321

[56] References Cited

U.S. PATENT DOCUMENTS

| | | | |
|---|---|---|---|
| 1,084,113 | 1/1914 | Rosino et al. | 362/281 |
| 1,766,637 | 6/1930 | Hopewell | 362/281 |
| 2,439,330 | 4/1948 | Zander | 362/321 |
| 2,695,547 | 11/1954 | Zander | 362/321 |
| 2,735,929 | 2/1956 | Erhardt et al. | 362/321 |
| 4,187,531 | 2/1980 | Lowell et al. . | |
| 4,200,902 | 4/1980 | Intrator . | |
| 4,322,779 | 3/1982 | Böhme et al. . | |
| 4,729,065 | 3/1988 | Bahnemann et al. . | |
| 4,788,628 | 11/1988 | Farrall . | |
| 4,811,182 | 3/1989 | Solomon | 362/321 |

*Primary Examiner*—Carroll B. Dority

[57] ABSTRACT

The I-snoot includes a circular casing having side walls extending forwardly from the front wall. A hand grip is adjustably secured to a flat plate iris diaphragm inside the casing allowing a full range of light to pass through the light control blade diaphragm. The I-snoot assembly has a second casing located on the opposite end of the circular casing, having side walls extending forwardly from the back wall. The back wall casing has a metal lip that protrudes outwardly from the assembly which allows attachment to standard lighting units. A transition zone interconnecting the light control blades is located inside each outer casing. The assembly also contains a lighting accessory adaptor on the front wall casing to use various photographic accessories, such as barn doors, gels, and various screens to control lighting intensities and variations.

3 Claims, 2 Drawing Sheets

I-SNOOT

BACKGROUND—FIELD OF INVENTION

This invention relates to controlled lighting, specifically precision spot lighting or broad or wide angle flood light, or to any intermediate position in order to accomplish the ultimate fine and exact lighting instantly.

BACKGROUND—DESCRIPTION OF PRIOR ART

Still photographers, motion picture, film photography, and videography/television personnel commonly use various lighting techniques to insure the best results possible. Such applications in todays market is for the most part, primitive in nature, and do not address the immediate need for precision controlled lighting alternatives.

Originally, Photographers would move the subject matter or light source to and from the subject matter in an effort to create a better lighting arrangement. However, photographers soon found this technique to be a non-productive approach. Thereafter, inventors created several types of light control devices in an attempt to meet a more suitable lighting objective. U.S. Pat. No. 4,200,902 to Charles Intrator (1978) discloses a more complex lighting unit that addresses the opening and closing of a box which allows a certian amount of light to flow from within. However, this particular unit is very cumbersome and does not address the precision lighting in which the new invention "The I-Snoot" presents.

Several types of devices have been proposed—for example: In Canada 556,803 to Artur Fischer (1958) which disclosed a foldable reflector unit 8. This invention relates to a flash bulb unit for compactabiltiy and to provide a flash bulb unit which consist of relatively few parts. None of which address the exact same objective as the I-Snoot.

In addition there have been other disclosed concepts that have been cited as being of further relevance with respect to the scope of the searched invention: For example, in the U.S. Pat. Nos. 4,187,531 (1980), 4,322,779 (1982), 4,729,065 (1988), 4,788,628 (1988), and in Finland patent 23,650 (1949). Each of these patents require either a movement of the bulb itself or requires barn doors to open and close in order to achieve similiar goals as the I-Snoot.

Our invention, (Disclosure Document No. 339935) The I-Snoot is based upon a very compact, light weight thin metal sheeting which opens and closes an iris diaphragm that gives an exact light or precision lighting ability.

Other inventions such as photography snoots and barn doors accomplish similiar objectives but do not achieve the same precision lighting nor the multiple spot or range of wide angle lighting alternatives as the easily controlled I-Snoot that give instant results.

OBJECTS AND ADVANTAGES

Accordingly, besides the objects and advantages of the precision lighting abilities other objects and advantages of the present invention are:

(a) to provide a convenient and extremely rapid and economical change of light source thats being produced instantaneously.

(b) to provide an interchangeable screen and gel attachment to allow additional lighting requirements.

(c) to provide a superior lighting alternative as to using the traditional barn door or snoot concept.

(d) to provide a wide range of flexiability in controlling a precision lighting situation.

(e) to provide the same distance between the light source and the subject matter, yet being able to control the amount of light emitted from the light source without moving or altering the subject matter or light source.

(f) to provide an iris diaphragm which allows pin-point accuracy every time.

SUMMARY OF THE INVENTION

It is an object of the present invention to provide a relatively compact and easily manipulated light control unit to direct a light source in a precision fashion by means of an open and close iris diaphragm to give exact lighting requirements.

Most conventional light fixtures accomplish a change in lighting dimension by means of a compensating channel or various metal rings positioned in front of the light into the photographing field. These techniques require replacement rings in each lighting application. The present invention includes a plurality of rotational positions by varying the position of the synchronized iris diaphragm which is formed inside a circumference casing. The surface is a black absorptive color which is heat resistant in nature. The advantage to the I-snoot verses other types of photo snoot or barn door accessories is the "iris diaphragm." This diaphragm allows complete control of your lighting needs with a full range of positions instantly.

By sliding the knob in one direction or the other, you accomplish complete control of your light/setting within seconds.

DRAWING FIGURES

In the drawings, closely related figures have the same number but different alphabetic suffixes.

FIG. 1 Shows an exploded perspective view illustrating the I-Snoot in detail.

FIG. 2 Shows a front view of the outside casing in its fully closed position.

FIG. 3 Shows a side elevation view of both outside casings jointed together.

FIG. 4 Shows a front view of the outside casing in its fully open position.

FIG. 5 Shows the inside view of the eight light control blades connected to the actuator plate and the outside front casing.

FIG. 6 Shows a perspective view, illustrating the assembled diaphragm attached to a standard lighting unit.

REFERENCE NUMERALS IN DRAWINGS

10 outside back casing
11 actuator plate
12 adjustable handle
13 light control blades
14 outside front casing
15 accessory adapter
16 pop-rivets/holes
17 shoulder bolts

DESCRIPTION OF THE DRAWINGS

With the above and additional objects and advantages in mind as will hereafter appear, the invention will be described with reference to the accompanying drawings, in which.

The handle 12 is part of the actuator plate.

Figure 3:
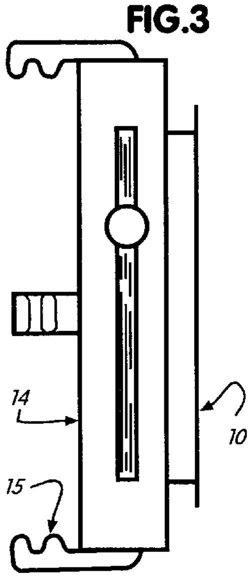

FIG. 3 is a side elevation view, of both outside casings 10 and 14 joined together to create the total unit. The assembly also contains a lighting accessory adapter kit 15 located on three sides of the front casing 14 protruding outwardly to allow the usage of additional attachments such as screens, barn doors and gels to control the lighting intensities and variations.

Figure 4:
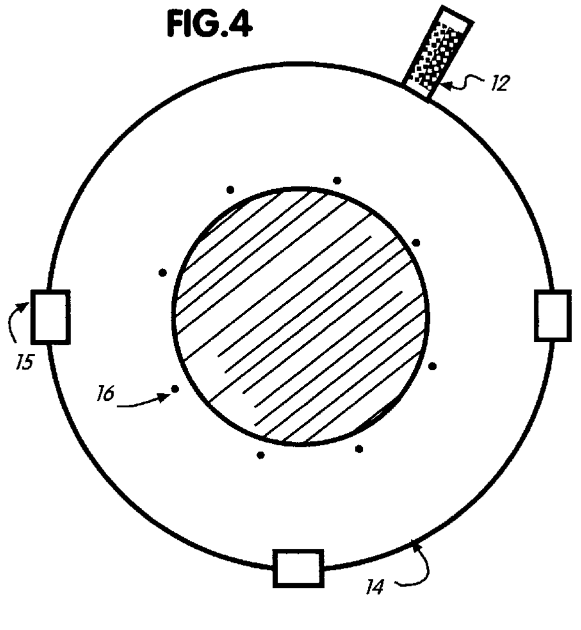

FIG. 4 is a front view of the outside casing, showing the Iris diaphragm in a fully open position.

Figure 5:
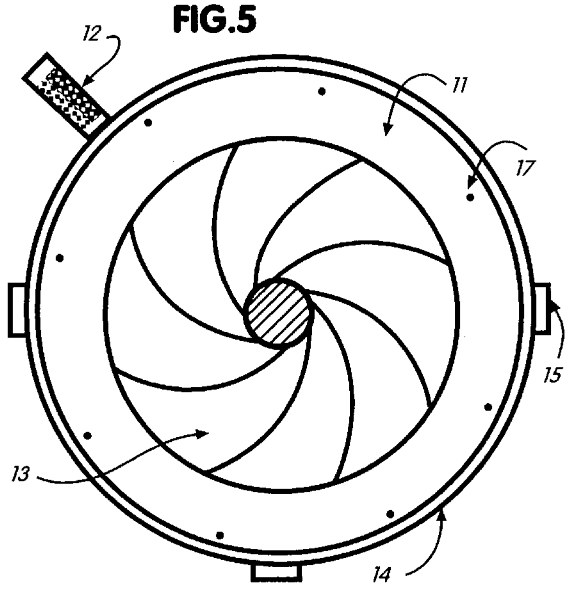

FIG. 5 is a schematic illustration of the present invention having connected the outside front casing 14 to the eight light control blades 13 which connects to the actuator plate, 11 by means of eight strategic holes that allow eight thin-headed shoulder bolts 17 to properly connect the assembly together.

The adjustable handle 12 is welded to the sheet metal heat reflector actuator plate allowing rotatable alternative positions by sliding the handle one way or the other.

Figure 6:
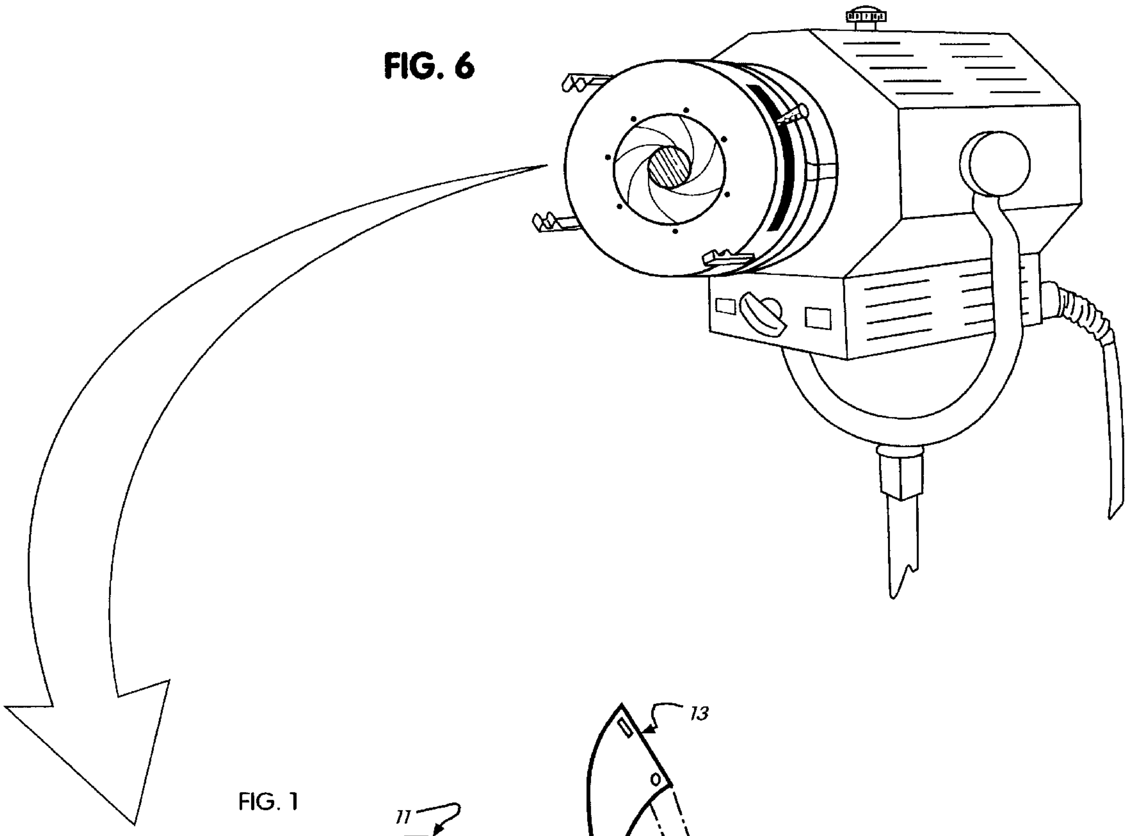
Figure 1:
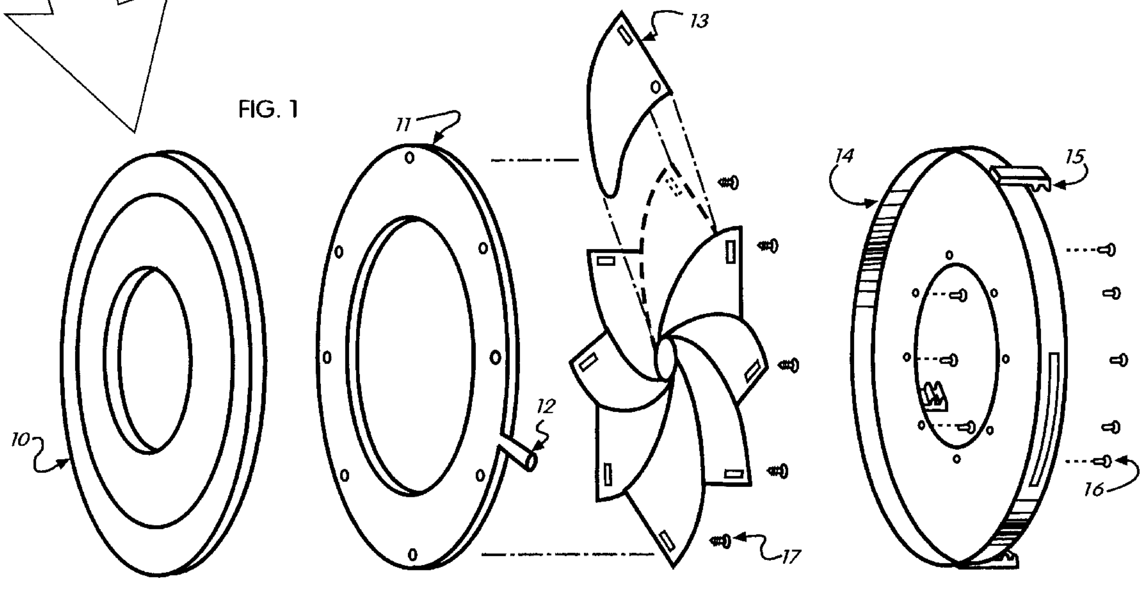
FIG. 1 is an exploded perspective view illustrating the I-snoot in detail. The outside casing 10 which holds the metal lip that protrudes outwardly from the assembly allows attachment to standard lighting units. This casing is conveniently made of two pieces of flat reflector metal sheets cut and bent into the illustrated shape. There is a large hole manufactured in the center of the casing which allows light to pass through the unit. Once manufactured, the two metal pieces would be welded together at the appropriate location to make them become one piece. The outside casing 10 would be slightly smaller in size in order to slide one casing inside the other casing 14 completely encompassing and holding together all of the pieces of the invention thus becoming what is now referred to as the I-snoot.
Figure 2:
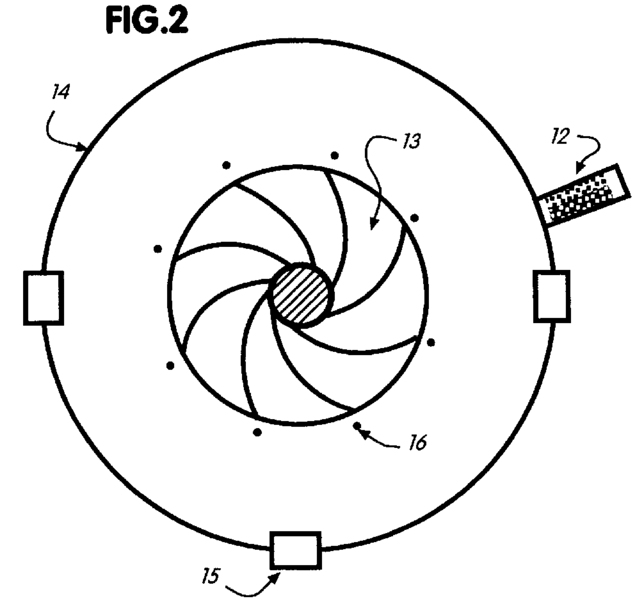
FIG. 2 is a front view, showing the Iris diaphragm in the fully closed position. This frontside casing 14 is slightly larger than the outside casing 10. Both casings contain a large hole in the center to allow light to pass through the unit. The outside casing 14 shows eight strategic holes 16 which allows eight pop-rivets to attach the casing to each of the eight light control blades 13. The eight light control blades will be slightly loose and would be made of a sheet metal die cut to size.

FIG. 6 is a perspective view, illustrating the Iris diaphragm assembly attached to a standard lighting unit.

We claim a new precision lighting accessory comprising:

1. A lighting accessory which allows complete annular control of light produced from various sized light fixtures by changing the emission of light depending on the desired setting of a large circular central aperture comprising:

a housing including a first male end piece having a central opening and a flange about its periphery and a second female end piece having a central opening and flange about its periphery, said flange of said first end piece being inserted within the flange of said second end piece and secured in place, an annular actuator plate located in said housing having a handle extending through a slot located in an outer periphery of said housing, a plurality of light control blades located about the inner periphery of said housing and adapted to form an adjustable central aperture, each of said light control blades being pivotally connected to said actuator plate and also pivotally connected one of said end pieces.

2. A lighting accessory as set forth in claim 1 further comprising adapter means extending from one of said end pieces for attaching light modifying elements.

3. A lighting accessory as set forth in claim 1 attached to a lighting fixture.

* * * * *